(12) United States Patent
Wang

(10) Patent No.: US 12,547,016 B2
(45) Date of Patent: Feb. 10, 2026

(54) GLASS FRAME STRUCTURE AND WEARABLE DEVICE

(71) Applicant: VIVO MOBILE COMMUNICATION CO., LTD., Dongguan (CN)

(72) Inventor: Wei Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 448 days.

(21) Appl. No.: 18/098,680

(22) Filed: Jan. 18, 2023

(65) Prior Publication Data

US 2023/0152603 A1    May 18, 2023

Related U.S. Application Data

(63) Continuation of application No. PCT/CN2021/108620, filed on Jul. 27, 2021.

(30) Foreign Application Priority Data

Jul. 28, 2020    (CN) .......................... 202010736413.1

(51) Int. Cl.
*G02B 27/01*    (2006.01)
*A61B 3/02*    (2006.01)
(Continued)

(52) U.S. Cl.
CPC ............ *G02C 5/12* (2013.01); *G02B 27/0176* (2013.01); *G02B 2027/0178* (2013.01); *G02C 2200/06* (2013.01)

(58) Field of Classification Search
CPC .......... G02B 27/0093; G02B 2027/014; G02B 27/0149; G02B 27/0101; G02B 27/1006;
(Continued)

(56) References Cited

U.S. PATENT DOCUMENTS 4,787,729 A    11/1988    Ruffen
5,971,538 A    10/1999    Heffner
(Continued)

FOREIGN PATENT DOCUMENTS

CN    202815338 U    3/2013
CN    106773125 A    5/2017
(Continued)

OTHER PUBLICATIONS

Extended European Search Report issued in related European Application No. 21851084.0, mailed Jan. 2, 2024, 9 pages.
(Continued)

*Primary Examiner* — Dawayne Pinkney
(74) *Attorney, Agent, or Firm* — IPX PLLC

(57) ABSTRACT

A glass frame structure and a wearable device having the glass frame structure are provided. The glass frame structure includes a nose pad, a glass frame body, and a limiting member. The nose pad includes one of a hook structure or a slot structure, and the glass frame body includes the other one of the hook structure or the slot structure. The limiting member is located at a first position or a second position. When the limiting member is located at the first position, the limiting member avoids the hook structure, and the hook structure is located in the slot structure and is movable in the slot structure; and when the limiting member is at the second position, the limiting member abuts against the hook structure and the hook structure is locked in the slot structure.

20 Claims, 6 Drawing Sheets

(51) Int. Cl.
*A61B 3/10* (2006.01)
*G02B 7/02* (2021.01)
*G02B 21/22* (2006.01)
*G02B 23/00* (2006.01)
*G02B 27/00* (2006.01)
*G02B 27/02* (2006.01)
*G02C 5/12* (2006.01)

(58) Field of Classification Search
CPC ......... A61B 3/02; A61B 3/102; A61B 3/1025; A61B 3/113; A61B 3/1015; A61B 3/0075; G02F 3/011
USPC .... 359/630–636, 462, 466, 404, 407; 345/7, 345/9, 156; 351/41, 159.75, 200, 205, 351/206, 208–210, 222
See application file for complete search history.

(56) References Cited

U.S. PATENT DOCUMENTS

| | | | |
|---|---|---|---|
| 6,480,174 | B1 | 11/2002 | Kaufmann et al. |
| 7,431,451 | B1 | 10/2008 | Lin |
| 2002/0101561 | A1 | 8/2002 | Miceli et al. |
| 2006/0055867 | A1* | 3/2006 | Xie .......................... G02C 9/00 351/41 |
| 2015/0146157 | A1 | 5/2015 | Tipp |
| 2019/0317336 | A1* | 10/2019 | Tsai .......................... G02C 5/12 |
| 2020/0192119 | A1* | 6/2020 | Chou ...................... A61F 9/029 |
| 2020/0341294 | A1* | 10/2020 | Cheng ................... G02C 5/124 |

FOREIGN PATENT DOCUMENTS

| | | |
|---|---|---|
| CN | 109407336 A | 3/2019 |
| CN | 210294708 U | 4/2020 |
| CN | 210534461 U | 5/2020 |
| CN | 111880322 A | 11/2020 |
| JP | 3212105 U | 8/2017 |
| JP | 6366085 B2 | 8/2018 |
| KR | 200443337 Y1 | 2/2009 |
| KR | 20120045835 A | 5/2012 |
| TW | M331117 U | 4/2008 |
| TW | 201634977 A | 10/2016 |

OTHER PUBLICATIONS

Notice of Reason of Reasons for Refusal issued in related Japanese Application No. 2023-504812, mailed Nov. 21, 2023, 10 pages.
Notice of Reason of Reasons for Refusal issued in related Japanese Application No. 2023-504812, mailed Mar. 5, 2024, 5 pages.
International Search Report issued in corresponding International Application No. PCT/CN2021/108620, mailed Oct. 8, 2021, 4 pages.
First Office Action issued in related Chinese Application No. 202010736413.1, mailed Sep. 24, 2021, 5 pages.
Second Office Action issued in related Chinese Application No. 202010736413.1, mailed Mar. 29, 2022, 4 pages.
Third Office Action issued in related Chinese Application No. 202010736413.1, mailed Aug. 29, 2022, 4 pages.

* cited by examiner

GLASS FRAME STRUCTURE AND WEARABLE DEVICE

CROSS-REFERENCE TO RELATED APPLICATIONS

This application is a continuation of International Application No. PCT/CN2021/108620, filed Jul. 27, 2021, which claims priority to Chinese Patent Application No. 202010736413.1, filed Jul. 28, 2020. The entire contents of each of the above-referenced applications are expressly incorporated herein by reference.

TECHNICAL FIELD

The present application relates to the technical field of electronic products, and in particular, to a glass frame structure and a wearable device.

BACKGROUND

With the development of electronic devices, there are more and more types of electronic devices, and there are also more and more types of wearable devices such as smart glasses and smart bracelets. For example, smart glasses have changed from the initial monocular form to head-mounted glasses, traditional glasses, etc. Users can enjoy the application experience by wearing smart glasses, so that more and more smart glasses products are favored by a wide range of users. However, for users who need to wear ordinary glasses on a daily basis, such as myopia glasses, if the user wears smart glasses after taking off the myopia glasses, the viewing experience of the smart glasses will be affected. If the smart glasses are worn directly without taking off the myopia glasses, because myopia glasses need to be accommodated between human eyes and the lens of the smart glasses, it is inconvenient to wear smart glasses due to the limited distance between the forehead and the smart glasses. In addition, the size of the nose support pad set on the glass frame in the current smart glasses is generally fixed. Due to the differences in the face shapes and nose shapes of different users, this type of smart glasses cannot be worn by different users.

SUMMARY

Embodiments of the present application provide a glass frame structure and a wearable device.

In a first aspect, the embodiments of the present application provide a glass frame structure, including:
  a nose pad, where the nose pad is provided with one of a hook structure or a slot structure;
  a glass frame body, where the glass frame body is provided with the other one of the hook structure or the slot structure; and
  a limiting member, where the limiting member is located at a first position or a second position;
  in a case that the limiting member is located at the first position, the limiting member avoids the hook structure, and the hook structure is located in the slot structure and is movable in the slot structure; and in a case that the limiting member is at the second position, the limiting member abuts against the hook structure and the hook structure is locked in the slot structure.

In a second aspect, the embodiments of the present application further provide a wearable device, including the glass frame structure as described above.

Figure 1:
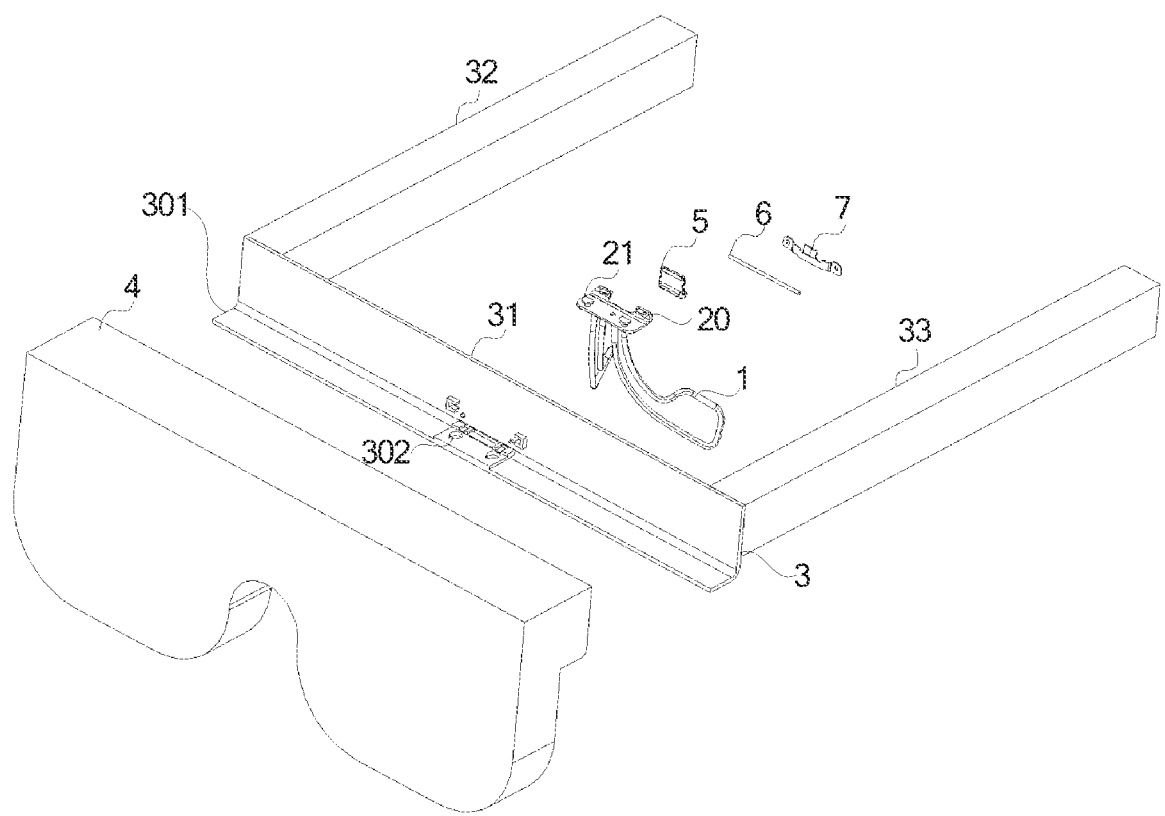
FIG. 1 is a schematic diagram of a glass frame structure according to an embodiment of the present application.

Reference numerals in the accompanying drawings are as follows:
  1. Nose pad;
  20. Fixed plate;
  21. First hook body; 211. First hook portion; 212. Connecting column;
  22. Bent portion; 221. Second hook body;
  23. Gap;
  3. Glass frame body;
  31. Installation frame; 32. First glass leg; 33. Second glass leg;
  301. First mounting plate; 302. First through hole; 303. Second mounting plate; 304. Second through hole; 305. Limiting groove; 306. Mounting column; 307. Mounting groove; 308. Third through hole;
  4. Glass frame front shell;
  5. Limiting member; 51. Second hook portion;
  6. Elastic member;
  7. Fixed piece; 71. First limiting portion; 72. Second limiting portion.

DETAILED DESCRIPTION

Exemplary embodiments of the present application will be described below in further detail with reference to the accompanying drawings. Although the exemplary embodiments of the present application are shown in the accompanying drawings, it should be understood that the present application may be implemented in various forms without being limited to the embodiments described herein. On the contrary, these embodiments are provided to enable a more thorough understanding of the present application and to fully convey the scope of the present application to those skilled in the art.

As shown in FIG. 1, embodiments of the present application provide a glass frame structure, including: a nose pad 1, a limiting member 5, and a glass frame body 3.

The nose pad 1 is provided with one of a hook structure or a slot structure; the glass frame body 3 is provided with the other one of the hook structure or the slot structure.

The limiting member 5 is located at a first position or a second position, wherein when the limiting member 5 is located at the first position, the limiting member 5 avoids the hook structure, and the hook structure is located in the slot structure and can move within the slot structure; and when the limiting member is at the second position, the limiting member abuts against the hook structure and the hook structure is locked in the slot structure.

In some embodiments, the glass frame structure may further include: a glass frame front shell 4, and the glass frame front shell 4 is connected to the glass frame body 3.

In some embodiments, the glass frame body 3 may include: a mounting frame 31, a first glass leg 32, and a second glass leg 33; wherein the first glass leg 32 is connected to a first end of the mounting frame 31, and the second glass leg 33 is connected to a second end of the mounting frame 31, and the first glass leg 32 and the second glass leg 33 are used to be worn on the ears.

In some embodiments, the nose pad 1 and the glass frame body 3 are connected through a hook structure and a slot structure, to ensure that the nose pad 1 is detachable relative to the glass frame body 3 and the nose pad 1 can be replaced, so that the same glass frame body 3 can be compatible with different types of nose pads 1 and can be applied for different users to wear. In a case that the nose pad 1 is installed on the glass frame body 3, the movement of the nose pad 1 relative to the glass frame body 3 can also be restricted by the limiting member 5. While the nose pad 1 is detachable relative to the glass frame body 3, installation reliability between the nose pad 1 and the glass frame body 3 is also ensured.

In some embodiments, the nose pad 1 can be provided with the hook structure and the glass frame body 3 can be provided with the slot structure, or the nose pad 1 can be provided with the slot structure and the glass frame body 3 can be provided with the slot structure, or the nose pad 1 and the glass frame body 3 can be detachable from each other through a cooperation structure of a chute and a slider. The embodiments of the present application are not limited thereto.

In the following, for example, the nose pad 1 is provided with the hook structure and the glass frame body 3 is provided with the slot structure:

The hook structure includes: a fixing plate 20 and a first hook body 21. A first surface of the fixing plate 20 is connected to the nose pad 1; and the first hook body 21 is provided on a second surface of the fixing plate 20; where the first surface and the second surface are provided opposite to each other.

The slot structure includes: a first through hole 302 opened on a first mounting plate 301 of the glass frame body 3.

When the limiting member 5 is located at the first position, the limiting member 5 avoids the fixing plate 20 and the first hook body 21 is located in the first through hole 302 and can move in the first through hole 302; and when the limiting member 5 is at the second position, the limiting member 5 abuts against the fixing plate 20 and the first hook body 21 is locked in the first through hole 302.

In some embodiments, the mounting frame 31 includes the first mounting plate 301, and the first mounting plate 301 is used to install the nose pad 1, and the nose pad 1 is used to be worn on the nose.

In the embodiments, the nose pad 1 and the glass frame body 3 are connected through cooperation of the first hook body 21 and the first through hole 302, to ensure that the nose pad 1 is detachable relative to the glass frame body 3 and the nose pad 1 can be replaced, so that the same glass frame body 3 can be compatible with different types of nose pads 1 and can be applied for different users to wear. Moreover, through the cooperative connection between the first hook body 21 and the first through hole 302, less space is occupied, which can avoid excessive increase in the volume of the glass frame structure.

Figure 2:
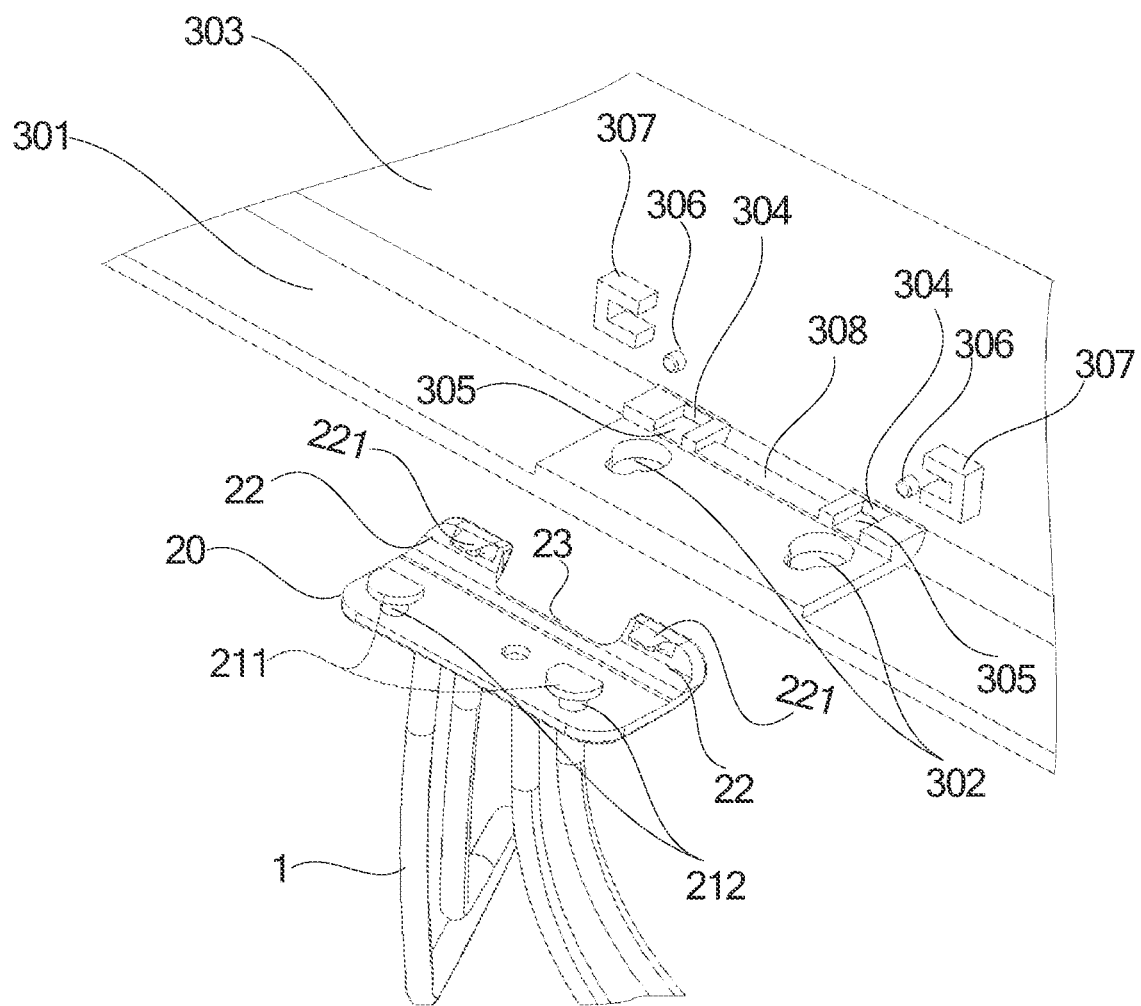
FIG. 2 is a partial schematic diagram 1 of a glass frame structure according to an embodiment of the present application.

As shown in FIG. 2, the first hook body 21 may be in the shape of a "mushroom head", and the first hook body 21 may include: a first hook portion 211 and a connecting column 212.

The nose pad 1 is arranged on the first surface of the fixed plate 20, the first end of the connecting column 212 is connected with the second surface of the fixed plate 20, and the first hook portion 211 is connected with the second end of the connecting column 212. The first hook portion 211 passes through the first through hole 302 along a direction from a first surface of the first mounting plate 301 to a second surface of the first mounting plate 301, and is fastened on the second surface of the first mounting plate 301. The first surface and the second surface are opposite to each other.

In this way, the first hook body 21 in the shape of a "mushroom head" can be locked on the second surface of the first mounting plate 301 through the first hook portion 211, so as to limit the left and right rotation of the nose pad 1 and limit the fall out of the nose pad 1 in the vertical direction (that is, the direction from the first surface to the second surface).

It should be noted that FIG. 2 shows an example in which the glass frame structure is provided with two first hook bodies 21 and a first through hole 302. Of course, in the embodiments of the present application, the numbers of the first hook bodies 21 and the first through holes 302 are not limited thereto.

In this embodiment, the first hook portion 211 and the nose pad 1 are arranged on opposite surfaces of the fixing plate 20 respectively, so that the first hook portion 211 can pass through the first surface and the second surface of the first mounting plate 301 and clamped on the second surface, to realize the clamping between the nose pad 1 and the glass frame body 3. Besides, the structure is simple and easy to disassemble and install, and through the clamping between the nose pad 1 and the glass frame body 3, the detachable connection between the nose pad 1 and the glass frame body 3 can be implemented without increasing the volume, so as to ensure that the same frame body 3 can be compatible with different types of nose pads, and can be worn by different users.

Figure 3:
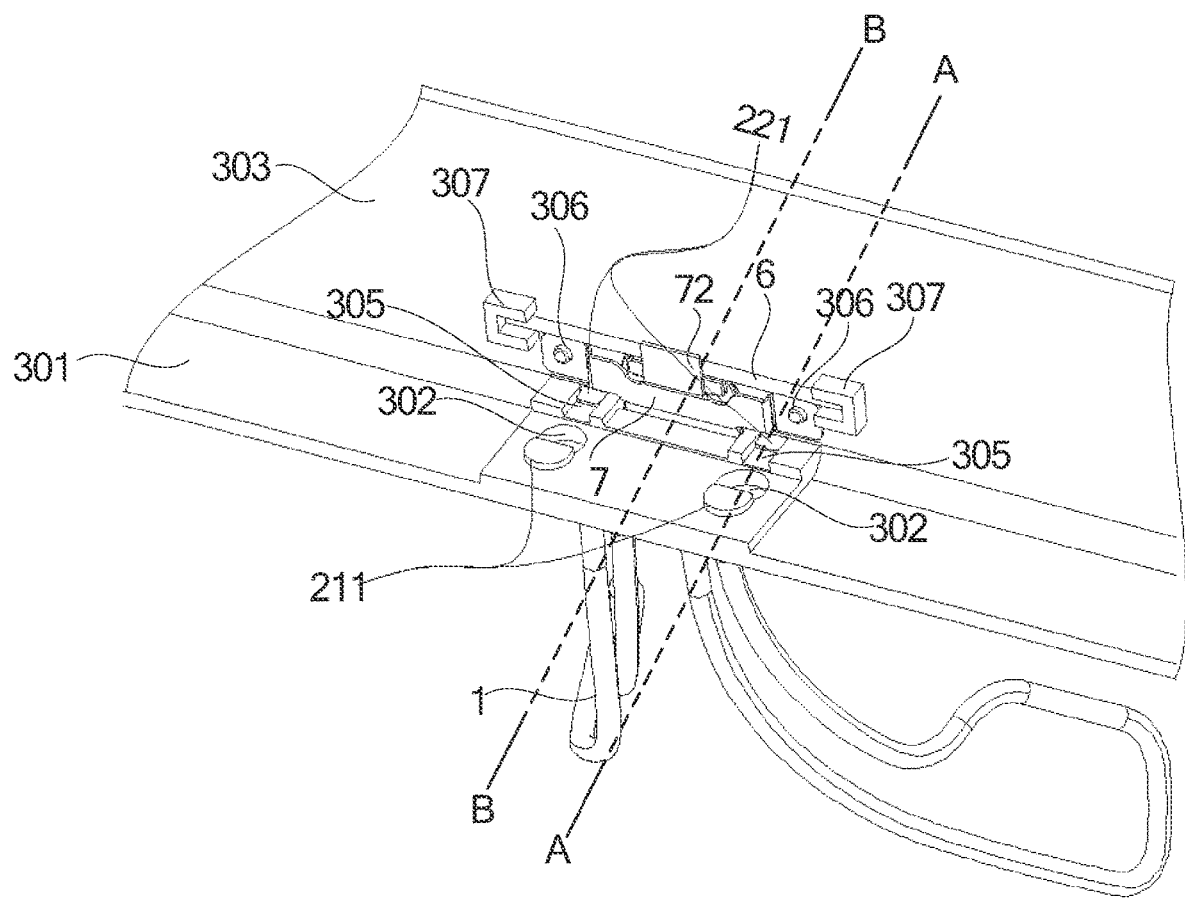
FIG. 3 is a partial schematic diagram 2 of a glass frame structure according to an embodiment of the present application.

As shown in FIG. 2 and FIG. 3, the first through hole 302 includes a first portion and a second portion.

A first size of the first portion along the first direction is larger than a second size of the second portion along the first direction, a third size of the first hook portion 211 along the first direction is larger than the second size, and a fourth size of the connecting column 212 along the first direction is smaller than the second size;

wherein after the first hook portion 211 passes through the first portion along the direction from the first surface of the first mounting plate 301 to the second surface of the first mounting plate, the first hook portion moves to the second portion and is fastened on the second surface.

In this embodiment, the first portion of the first through hole 302 fits the first hook portion 211, so that the first hook portion 211 can be vertically inserted into the first portion of the first through hole 302; the second portion of the first through hole 302 is used to fit the part of the connecting column 212, so that when the first hook portion 211 passes through the first portion and moves to the second portion, the first hook portion 211 locks the connecting column 212 except the position where the first portion communicates with the second portion, to prevent the nose pad 1 from shaking.

In some embodiments, the first direction may be radial, for example: the diameter of the first portion is larger than the diameter of the second portion; the diameter of the first hook portion 211 is larger than the diameter of the second portion and smaller than the diameter of the first portion. In this way, the first hook portion 211 can pass through the first portion from the first surface of the fixed plate 20 to reach the second surface, and be clamped within the second portion on the second surface of the fixed plate 20.

In some embodiments, the diameter of the connecting column 212 is smaller than the diameter of the second portion, which can ensure that the connecting column 212 can be located in the second part, so that the first hook portion 211 can be clamped on the second surface of the first mounting plate 301.

It should be noted that the diameter in the embodiments of the present application do not limit that the shapes of the first portion, the second portion and the first hook portion 211 are a circle or an arc, and it can also be a square, an ellipse, etc., and the diameter can also be broadly understood as the circumcircle diameter of a square, etc.

In some embodiments, one of the second hook body or the second through hole is further provided on the fixing plate 20. The second mounting plate 303 of the glass frame body 3 is provided with the other of the second hook body and the second through hole; wherein the first mounting plate 301 and the second mounting plate 303 are arranged in a predetermined angle, and when the fixing plate 20 is installed on the glass frame body 3, the second hook body is locked in the second through hole.

In this embodiment, the nose pad 1 is clamped on the plane of the first mounting plate 301 of the glass frame body 3 through the first hook body 21 and the first through hole 302. On this basis, the second hook body and the second through hole implement that the nose pad 1 is clamped on the second mounting plate 303 arranged at a preset angle with the first mounting plate 301, so as to ensure that the connection between the nose pad 1 and the glass frame body 3 is more stable and improve the connection reliability.

In some embodiments, the fixing plate 20 may be provided with the second hook body and the glass frame body 3 may be provided with the second through hole, or the fixing plate 20 may be provided with the second through hole and the glass frame body 3 may be provided with the second hook body, which is not limited in this embodiment of the present application.

Figure 4:
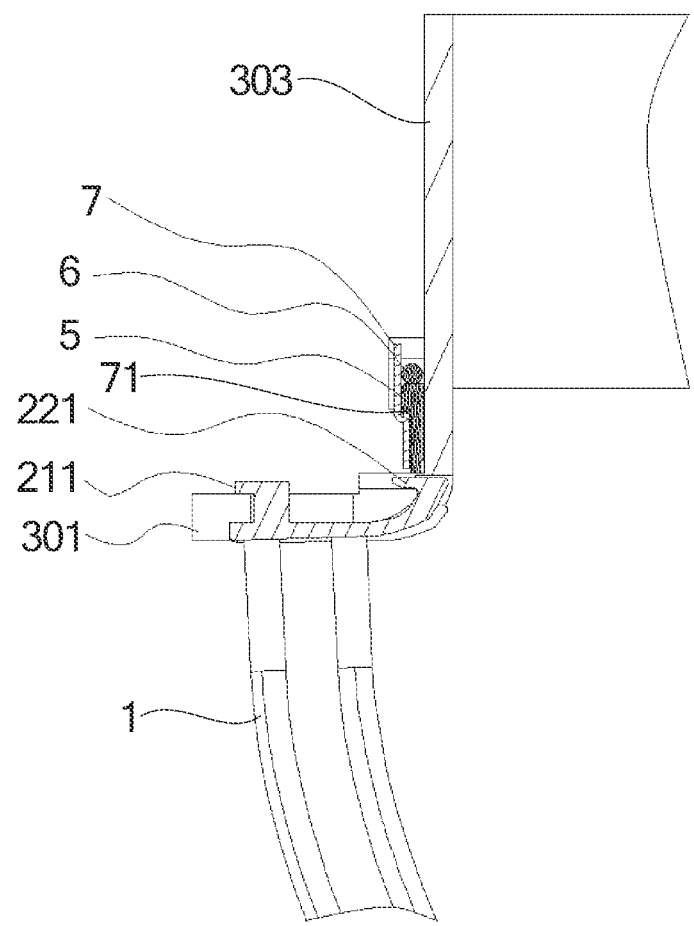
FIG. 4 is a sectional view of A-A direction in FIG. 3.

In the following, for example, the fixing plate 20 is provided with the second hook body 221 and the glass frame body 3 is provided with the second through hole 304:

As shown in FIG. 2 to FIG. 4, the hook structure further includes: a second hook body 221, where the second hook body 221 is located on the second surface of the fixing plate 20.

The slot structure further includes: a second through hole 304 opened on the second mounting plate 303 of the glass frame body 3; wherein the first mounting plate 301 and the second mounting plate 303 are arranged at a preset angle.

When the limiting member 5 is located at the first position, the limiting member 5 avoids the fixing plate 20 and the second hook body 221 is located in the second through hole 304 and can move in the second through hole 304; and when the limiting member 5 is at the second position, the limiting member 5 abuts against the fixing plate 20 and the second hook body 221 is locked in the second through hole 304.

In some embodiments, the fixing plate 20 includes a bent portion 22 bent toward the second surface of the fixing plate 20, and the second hook body 221 is disposed on the bent portion 22.

The first surface of the fixing plate 20 is arranged opposite to the side where the nose pad 1 is located; for example: the second hook body 221 can be arranged on a side of the bent portion 22 facing the first hook body 21. The slot structure includes a second through hole 304 opened on the second mounting plate 303; for example: the second through hole 304 can be provided at the connecting position between the first mounting plate 301 and the second mounting plate 303. In some embodiments, the location of the second through hole 304 may be determined according to the height of the bent portion 22 and the location of the second hook body 221 on the bent portion 22, which is not limited in the embodiments of the present application.

The second hook body 221 passes through the second through hole 304 along a direction from a first surface of the second mounting plate 303 to a second surface of the second mounting plate 303; the first surface of the second mounting plate 303 is connected to the first surface of the first mounting plate 301, and the second surface of the second mounting plate 303 is connected to the second surface of the first mounting plate 301.

In some embodiments, the first mounting plate 301 and the second mounting plate 303 may be integrally formed, or the second mounting plate 303 may also be formed by bending a part of the first mounting plate 301 toward the second surface.

It should be noted that FIG. 2 and FIG. 3 show an example in which the glass frame structure is provided with two second hook bodies 221 and a second through hole 304. Of course, in the embodiments of the present application, the numbers of the second hook bodies 221 and the second through holes 304 are not limited thereto.

In some embodiments, the first surface of the first mounting plate 301 is provided with a limiting groove 305, and the opening of the limiting groove 305 is set opposite to the second through hole 304; wherein the second hook body 221 pass through the second through hole 304 and be locked in the limiting groove 305.

It should be noted that an example of the limiting groove 305 is shown in FIG. 2 and FIG. 3. Of course, the limiting groove 305 can also be in other forms, for example, the limiting groove 305 can be a closed groove with an opening, where the opening is provided around the second through hole 304, so that when the second hook body 221 passes through the second through hole 304 and is locked in the limiting groove 305, the limiting groove 305 locks the second hook body 221 to prevent the second hook body 221 from shaking, thereby further improving the reliability of the connection between the nose pad 1 and the glass frame body 3.

As shown in FIG. 1 and FIG. 3, the glass frame structure further includes: a fixed piece 7, wherein the fixed piece 7 is fixedly connected to the second mounting plate 303 of the glass frame body 3, an accommodation space is formed between the fixed piece 7 and the second mounting plate 303, and at least a part of the limiting member 5 is located within the accommodation space.

In some embodiments, a mounting column 306 may be provided on the second mounting plate 303; a mounting hole corresponding to the mounting column 306 may be provided on the fixing plate 7. The mounting column 306 is penetrated in the mounting hole to realize the fixing of the fixing piece 7 and the second mounting plate 303. For example: the fixing piece 7 can be riveted with the mounting column 306, of course, this embodiment of the present application is not limited thereto.

In some embodiments, the mounting column 306 may include a first mounting column and a second mounting column; a first mounting hole and a second mounting hole are provided on the fixing piece 7, and the first mounting hole is located at the first end of the fixing piece 7, and arranged corresponding to the first mounting column; the second mounting hole is located at the second end of the fixing piece 7, and arranged corresponding to the second mounting column.

In some embodiments, the fixing piece 7 is provided with a first limiting portion 71; wherein in a case that the limiting member 5 is at the first position, the limiting member 5 is away from the first limiting portion 71; in a case that the limiting member 5 is at the second position, the limiting member 5 abuts against the first limiting portion 71.

Figure 5:
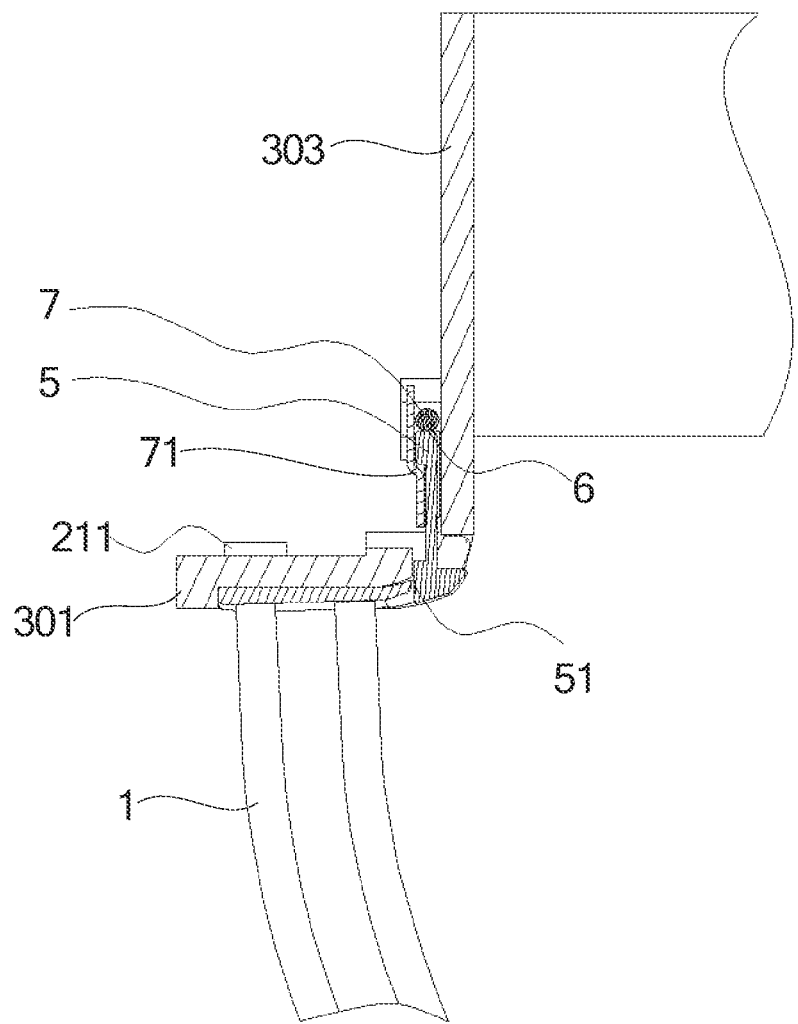
FIG. 5 is a sectional view in which a limiting member is in a second position in B-B direction in FIG. 3.
Figure 6:
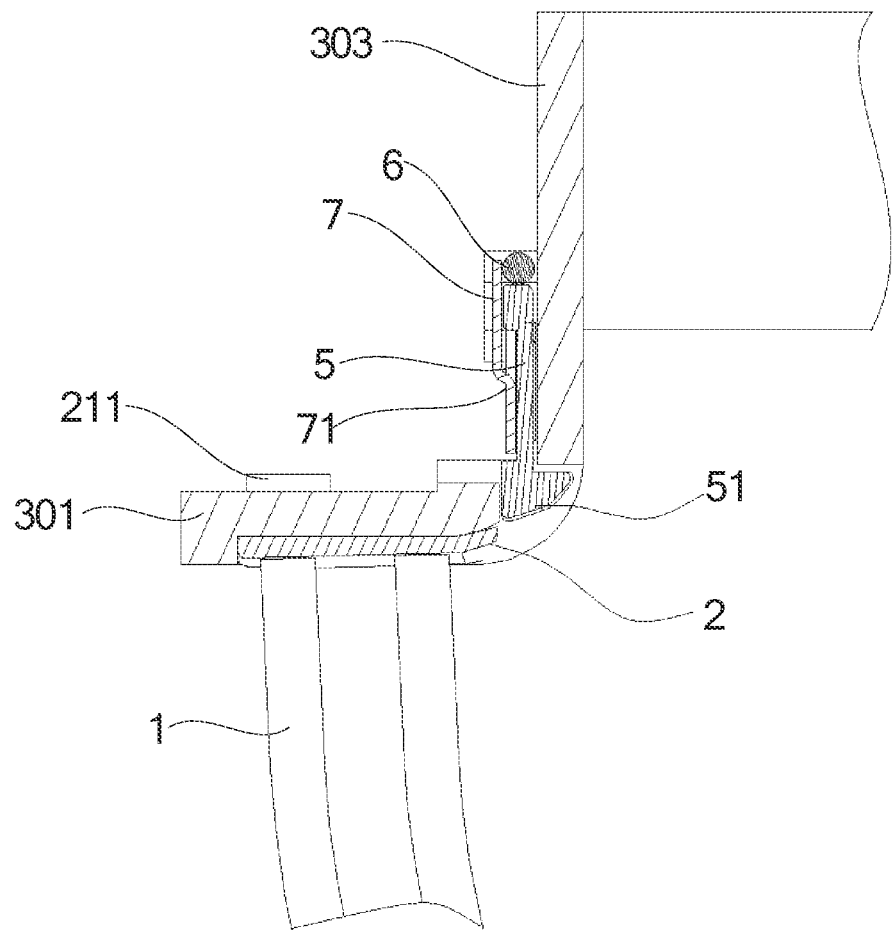
FIG. 6 is a sectional view in which a limiting member is in a first position in B-B direction in FIG. 3.

As shown in FIG. 5 and FIG. 6, the fixing piece 7 includes a first fixing portion, a second fixing portion, and a first limiting portion 71 connected between the first fixing portion and the second fixing portion. In some embodiments, the first end of the first limiting portion 71 is connected to the first fixing portion, and the first predetermined angle is formed between the first limiting portion 71 and the first fixing portion; the second end of the first limiting portion 71 is connected to the second fixing portion, and a second preset angle is formed between the first limiting portion 71 and the second fixing portion; the first fixing portion and the second fixing portion extend in opposite directions relative to the connecting portion.

In this way, when the fixing piece 7 is installed on the second mounting plate 303, the first fixing portion is arranged close to the first mounting plate 301, and the distance between the first fixing portion and the second mounting plate 303 is smaller than the distance between the second fixing portion and the second mounting plate 303, to ensure that the limiting member 5 can move in the accommodation space.

The corresponding limiting member 5 is also provided with a recess matching the first limiting portion 71, so that in a case that the limiting member 5 is at the second position, the limiting member 5 and the first limiting portion 71 abut to prevent the limiting member 5 from coming out, thereby improving the locking reliability of the limiting member 5.

In some embodiments, the glass frame structure further includes: an elastic member 6, wherein a first end and a second end of the elastic member 6 are respectively connected to the second mounting plate 303; and the first end of the limiting member 5 is located in the accommodation space and connected to the elastic member 6;
wherein in a case that the limiting member 5 is at the first position, the elastic member 6 is in a first state, and the second end of the limiting member 5 avoids the fixing plate 20; in a case that the limiting member 5 is at the second position, the elastic member 6 is in a second state, and the second end of the limiting member 5 abuts against the fixing plate 20.

In some embodiments, the elastic member 6 can be a spring, a leaf spring or other elastic components.

In some embodiments, the second mounting plate 303 may also be provided with a mounting groove 307, and the elastic member 6 may be disposed in the mounting groove 307. For example: the second mounting plate 303 is provided with a first mounting groove and a second mounting groove, and the first end of the elastic member 6 is fixed in the first mounting groove, and the second end of the elastic member 6 is fixed in the second mounting groove. In this way, the middle part of the elastic member 6 between the first end and the second end can elastically compress the limiting member 5. In a natural state (or elastic recovery state) of the elastic member 6, the elastic member 6 abuts against the limiting member 5 to prevent the limiting member 5 from coming out.

In some embodiments, the fixing piece 7 is provided with a second limiting portion 72, and the elastic member 6 is located between the second limiting portion 72 and the second mounting plate 303.

In some embodiments, the middle part of the elastic member 6 between the first end and the second end is located between the second limiting portion 72 and the second mounting plate 303, and the second limiting portion 72 is used to limit the elastic member 6 in the horizontal direction (the left-right direction as shown in FIG. 5 and FIG. 6), to prevent the elastic member 6 from coming out.

In some embodiments, a locking mechanism is formed by the fixing piece 7, the limiting member 5 and the elastic member 6; and the locking mechanism has a locked state and an unlocked state. The locked state is a state in which the limiting member 5 is located at the second position, and the unlocked state is a state in which the limiting member 5 is located at the first position.

The locking mechanism can be arranged on the first surface of the second mounting plate 303 or on the second surface of the second mounting plate 303.

For example: when the locking mechanism is disposed on the second surface of the second mounting plate 303, as shown in FIG. 4, the first mounting plate 301 is further provided with a third through hole 308.

In a case that the limiting member 5 is at the first position, the limiting member 5 is away from the third through hole 308; and in a case that the limiting member 5 is at the second position, at least a part of the limiting member 5 is located in the third through hole 308 and abuts against the fixing plate 20.

In this embodiment, the third through hole 308 is opened on the first mounting plate 301, to ensure that the limiting member 5 can pass through the first mounting plate 301 to abut against the fixing plate 20, thereby locking the fixing plate 20. That is, the nose pad 1 is limited to move relative to the glass frame body 3.

In some embodiments, the fixing piece 7 is fixed on the second surface of the second mounting plate 303, and forms the accommodation space with the second surface of the second mounting plate 303. A notch 23 is also provided on the fixing plate 20; when the hook structure is located in the slot structure, the third through hole 308 is provided opposite to the notch 23.

When the limiting member 5 is located at the first position, the elastic member 6 is in the first state, and the limiting member 5 is away from the notch 23; when the limiting member 5 is located at the second position, the elastic member 6 is in the second state, the second end of the limiting member 5 passes through the notch 23, and at least a part of the limiting member 5 is in the third through hole 308.

In this embodiment, the notch 23 is provided on the fixing plate 20, and when the limiting member 5 passes through the first mounting plate 301, the limiting member 5 partially abuts against the notch 23, so that the limiting member 5 locks the fixing plate 20. That is, while restricting the movement of the nose pad 1 relative to the glass frame body 3, this can also reduce the increased volume of the glass frame structure.

In some embodiments, the second end of the limiting member 5 is provided with a second hook portion 51, the second hook portion 51 is located in the third through hole 308, and in a case that the limiting member 5 is located at the first position, the second hook portion 51 abuts against an inner wall of the third through hole 308.

In some embodiments, when the limiting member 5 is at the first position, the second hook portion 51 is locked on an inner wall of the third through hole 308, to ensure that the second end of the limiting member 5 can be located in the third through hole 308, to prevent the limiting member 5 from coming out when the nose pad 1 is removed or replaced.

In some embodiments, a locking mechanism is formed by the fixing piece 7, the limiting member 5 and the elastic member 6; and the locking mechanism has a locked state and an unlocked state. The locked state is a state in which the limiting member 5 is located at the second position, and the unlocked state is a state in which the limiting member 5 is located at the first position.

When the nose pad 1 needs to be installed, the locking mechanism may be moved (for example, the limiting member 5 is moved) by an external force, to make the locking mechanism at a position of the unlocked state shown in FIG. 6 (that is, the limiting member 5 is at the first position). In this way, the first hook body 21 can be clamped in the first through hole 302, and the second hook body 221 can be clamped in the second through hole 304 to realize the installation of the nose pad 1. In this case, the force acted on the locking mechanism may be released, so that the locking mechanism restores to the position of the locked state shown in FIG. 5, thereby realizing the locking of the fixed plate 20 (for example, limiting the movement of the fixed plate 20 in the left and right direction in FIG. 5), to prevent the fixed plate 20 from slipping out.

When it is necessary to take out or replace the nose pad 1, the locking mechanism can be moved by an external force to make the locking mechanism at the position of the unlocked state shown in FIG. 6. In this way, the first hook body 21 may slide out of the first through hole 302 to detach from locking, and the second hook body 221 slides out of the second through hole 304, so that the nose pad 1 is separated from the glass frame body 3. At this time, the replaced nose pad 1 can be installed on the glass frame body 3 (the process is as described above and is not repeated herein). After the replacement, the force acting on the locking mechanism can be released to restore the locking mechanism to the position of the locked state shown in FIG. 5, so as to realize the locking of the fixing plate 20 and prevent the fixing plate 20 from sliding out.

Embodiments of the present application further provide a wearable electronic device, including the glass frame structure as described above. The wearable electronic device may be Augmented Reality (AR) glasses, Virtual Reality (VR) glasses, etc., and this embodiment of the present application is not limited thereto.

The glass frame structure in the above embodiments of the present application can also be applied to common glasses, such as myopia glasses, hyperopia glasses, decorative glasses, etc., and the embodiments of the present application are not limited thereto.

In the above solution, when the user has different types of nose pads to wear, the second end (the second hook portion 51) of the limiting member 5 may be pressed, so that the limiting member 5 can be switched from the second position to the first position, that is, the locking mechanism switches from the locked state to the unlocked state, and then the nose pad 1 can be slid out to remove the nose pad 1. At the same time, the second end of the limiting member 5 can be pressed and slid into the nose pad 1 to realize the installation of the nose pad 1. This realizes the replaceability of the nose pad 1, so as to ensure that one glass frame structure can be compatible with different types of requirements of the nose pad 1 of users, and the structural features occupy small space.

Each embodiment in this specification is described in a progressive manner, each embodiment focuses on the difference from other embodiments, and the same and similar parts between the embodiments may refer to each other.

Although exemplary embodiments of the present application have been described, those skilled in the art may make additional changes and modifications to these embodiments once they learn the basic inventive concept. Therefore, the appended claims are intended to be interpreted as including the exemplary embodiments and all changes and modifications that fall within the scope of the embodiments of the present application.

Finally, it should be further noted that, in this specification, relationship terms such as first and second are only used to distinguish an entity or operation from another entity or operation, but do not necessarily require or imply that there is any actual relationship or order between these entities or operations. Moreover, the terms "include", "comprise", or any of their variants are intended to cover a non-exclusive inclusion, so that a process, a method, an article, or a terminal device that includes a list of elements not only includes those elements but also includes other elements that are not listed, or further includes elements inherent to such a process, method, article, or terminal device. Without more restrictions, the elements defined by the sentence "including a . . . " do not exclude the existence of other identical elements in the process, method, article, or terminal device including the elements.

The above embodiments are exemplary embodiments of the present application. It should be noted that, within the technical concept of the present application, those ordinarily skilled in the art can make various improvements and modifications, which shall all fall within the protective scope of the present application.

The invention claimed is:

1. A glass frame structure, comprising:
    a nose pad, comprising one of a hook structure or a slot structure;
    a glass frame body, comprising the other of the hook structure or the slot structure; and
    a limiting member, located at a first position or a second position and being movable between the first position and the second position,
    wherein when the limiting member is located at the first position, the limiting member is away from the hook structure, and the hook structure is located in the slot structure and is movable in the slot structure; and
    when the limiting member is at the second position, the limiting member abuts against the hook structure, and the hook structure is locked in the slot structure.

2. The glass frame structure according to claim 1, wherein when the nose pad comprises the hook structure,
    the hook structure comprises:
        a fixed plate, wherein a first surface of the fixed plate is connected to the nose pad; and
        a first hook body on a second surface of the fixed plate, wherein the first surface and the second surface are opposite to each other;
    the slot structure comprises:
        a first through hole on a first mounting plate of the glass frame body,
    wherein when the limiting member is at the first position, the limiting member is away from the fixed plate, and the first hook body is located in the first through hole and is movable in the first through hole; and when the limiting member is at the second position, the limiting member abuts against the fixed plate, and the first hook body is locked inside the first through hole.

3. The glass frame structure according to claim 2, wherein the first hook body comprises:
   a connecting column, wherein a first end of the connecting column is connected to the second surface of the fixed plate; and
   a first hook portion, wherein the first hook portion is connected to a second end of the connecting column,
   wherein the first hook portion passes through the first through hole along a direction from a first surface of the first mounting plate to a second surface of the first mounting plate, and is fastened on the second surface of the first mounting plate.

4. The glass frame structure according to claim 3, wherein the first through hole comprises a first portion and a second portion,
   wherein a first size of the first portion along the first direction is larger than a second size of the second portion along the first direction, a third size of the first hook portion along the first direction is larger than the second size, the third size is smaller than the first size, and a fourth size of the connecting column along the first direction is smaller than the second size;
   wherein the first hook portion, after passing through the first portion along the direction from the first surface of the first mounting plate to the second surface of the first mounting plate, is moved to the second portion of the first through hole, and is fastened on the second surface of the first mounting plate.

5. The glass frame structure according to claim 2, wherein:
   the hook structure further comprises a second hook body, wherein the second hook body is located on the second surface of the fixed plate; and
   the slot structure further comprises a second through hole on the second mounting plate of the glass frame body, wherein the first mounting plate and the second mounting plate are arranged at a preset angle,
   wherein when the limiting member is at a first position, the limiting member is away from the fixed plate, and the second hook body is located in the second through hole and is movable in the second through hole; and
   when the limiting member is at a second position, the limiting member abuts against the fixed plate, and the second hook body is locked inside the second through hole.

6. The glass frame structure according to claim 5, wherein the fixed plate comprises a bent portion bent toward the second surface of the fixed plate, and the second book body is disposed on the bent portion;
   wherein the second hook body passes through the second through hole along a direction from a first surface of the second mounting plate to a second surface of the second mounting plate; the first surface of the second mounting plate is connected to the first surface of the first mounting plate, and the second surface of the second mounting plate is connected to the second surface of the first mounting plate.

7. The glass frame structure according to claim 6, comprising a limiting groove on the first surface of the first mounting plate, and the limiting groove comprises an opening that is opposite to the second through hole,
wherein the second hook body passes through the second through hole and is fastened in the limiting groove.

8. The glass frame structure according to claim 2, further comprising:
   a fixed piece, wherein the fixed piece is fixedly connected to the second mounting plate of the glass frame body, an accommodation space is formed between the fixed piece and the second mounting plate, and at least a part of the limiting member is located within the accommodation space.

9. The glass frame structure according to claim 8, comprising a first limiting portion on the fixed piece;
   wherein when the limiting member is at the first position, the limiting member is away from the first limiting portion; and
   when the limiting member is at the second position, the limiting member abuts against the first limiting portion.

10. The glass frame structure according to claim 8, further comprising:
    an elastic member, wherein a first end and a second end of the elastic member are respectively connected to the second mounting plate; and the first end of the limiting member is located in the accommodation space and connected to the elastic member;
    wherein when the limiting member is at the first position, the elastic member is in a first state, and the second end of the limiting member is away from the fixed plate; and
    when the limiting member is at the second position, the elastic member is in a second state, and the second end of the limiting member abuts against the fixed plate.

11. The glass frame structure according to claim 10, comprising a second limiting portion on the fixed piece, and the elastic member is located between the second limiting portion and the second mounting plate.

12. The glass frame structure according to claim 2, wherein the first mounting plate further comprises a third through hole;
    wherein when the limiting member is at the first position, the limiting member is away from the third through hole; and
    when the limiting member is at the second position, at least a part of the limiting member is located in the third through bole and abuts against the fixed plate.

13. The glass frame structure according to claim 12, wherein the second end of the limiting member comprises a second hook portion, the second hook portion is located in the third through hole, and when the limiting member is located at the first position, the second hook portion abuts against an inner wall of the third through hole.

14. A wearable device, comprising a glass frame structure, wherein the glass frame structure comprises:
    a nose pad, comprising one of a hook structure or a slot structure;
    a glass frame body, comprising the other of the hook structure or the slot structure; and
    a limiting member, located at a first position or a second position and being movable between the first position and the second position,
    wherein when the limiting member is located at the first position, the limiting member is away from the hook structure, and the hook structure is located in the slot structure and is movable in the slot structure; and
    when the limiting member is at the second position, the limiting member abuts against the hook structure, and the hook structure is locked in the slot structure.

15. The wearable device according to claim 14, wherein when the nose pad comprises the hook structure,
the hook structure comprises:
a fixed plate, wherein a first surface of the fixed plate is connected to the nose pad; and
a first hook body on a second surface of the fixed plate, wherein the first surface and the second surface are opposite to each other;
the slot structure comprises:
a first through hole on a first mounting plate of the glass frame body,
wherein when the limiting member is at the first position, the limiting member is away from the fixed plate, and the first hook body is located in the first through hole and is movable in the first through hole; and
when the limiting member is at the second position, the limiting member abuts against the fixed plate, and the first hook body is locked inside the first through hole.

16. The wearable device according to claim 15, wherein the first hook body comprises:
a connecting column, wherein a first end of the connecting column is connected to the second surface of the fixed plate; and
a first hook portion, wherein the first hook portion is connected to a second end of the connecting column,
wherein the first hook portion passes through the first through hole along a direction from a first surface of the first mounting plate to a second surface of the first mounting plate, and is fastened on the second surface of the first mounting plate.

17. The wearable device according to claim 16, wherein the first through hole comprises a first portion and a second portion,
wherein a first size of the first portion along the first direction is larger than a second size of the second portion along the first direction, a third size of the first hook portion along the first direction is larger than the second size, the third size is smaller than the first size, and a fourth size of the connecting column along the first direction is smaller than the second size;
wherein the first hook portion, after passing through the first portion along the direction from the first surface of the first mounting plate to the second surface of the first mounting plate, is moved to the second portion of the first through hole, and is fastened on the second surface of the first mounting plate.

18. The wearable device according to claim 15, wherein:
the hook structure further comprises a second hook body, wherein the second hook body is located on the second surface of the fixed plate; and
the slot structure further comprises a second through hole on the second mounting plate of the glass frame body, wherein the first mounting plate and the second mounting plate are arranged at a preset angle,
wherein when the limiting member is at a first position, the limiting member is away from the fixed plate, and the second hook body is located in the second through hole and is movable in the second through hole; and
when the limiting member is at a second position, the limiting member abuts against the fixed plate, and the second book body is locked inside the second through hole.

19. The wearable device according to claim 18, wherein the fixed plate comprises a bent portion bent toward the second surface of the fixed plate, and the second hook body is disposed on the bent portion;
wherein the second hook body passes through the second through hole along a direction from a first surface of the second mounting plate to a second surface of the second mounting plate; the first surface of the second mounting plate is connected to the first surface of the first mounting plate, and the second surface of the second mounting plate is connected to the second surface of the first mounting plate.

20. The wearable device according to claim 19, comprising a limiting groove on the first surface of the first mounting plate, and the limiting groove comprises an opening that is opposite to the second through hole,
wherein the second hook body passes through the second through hole and is fastened in the limiting groove.

* * * * *